United States Patent [19]
Stalpes et al.

[11] Patent Number: 6,082,083
[45] Date of Patent: Jul. 4, 2000

[54] GROUND SPEED CONTROL SYSTEM

[75] Inventors: Philip G. Stalpes, Hamel; Larry W. Schmidt, Farmington; Richard A. Thorud, Bloomington; Henry B. Tillotson, III, Minneapolis; Nathan J. Friberg, Bloomington, all of Minn.

[73] Assignee: The Toro Company, Minneapolis, Minn.

[21] Appl. No.: 09/156,981

[22] Filed: Sep. 18, 1998

[51] Int. Cl.⁷ .................................................. A01D 69/08
[52] U.S. Cl. ............................... 56/11.6; 56/10.8; 56/11.1; 56/11.3
[58] Field of Search ..................... 56/10.8, 11.1, 56/11.3, 11.6, 11.8, 16.7; 180/19.1, 19.2, 19.3

[56] References Cited

U.S. PATENT DOCUMENTS

| | | | |
|---|---|---|---|
| 2,247,333 | 6/1941 | Funk ........................................ | 180/19.3 |
| 2,329,952 | 9/1943 | Speiser ...................................... | 56/11.6 |
| 2,513,685 | 7/1950 | Smith et al. . | |
| 2,601,752 | 7/1952 | Rose . | |
| 2,645,300 | 7/1953 | Watts . | |
| 2,791,079 | 5/1957 | Funk ........................................ | 56/11.6 |
| 3,079,743 | 3/1963 | Egley ........................................ | 56/11.6 |
| 4,295,326 | 10/1981 | Green ........................................ | 56/11.6 |
| 4,558,558 | 12/1985 | Horner, Jr. et al. ....................... | 56/11.3 |
| 4,704,847 | 11/1987 | Greider et al. ............................. | 56/10.5 |
| 4,835,949 | 6/1989 | Seyerle . | |
| 4,878,339 | 11/1989 | Marier et al. ............................. | 56/14.7 |
| 5,138,824 | 8/1992 | Oshima et al. ............................ | 56/10.2 |
| 5,146,735 | 9/1992 | McDonner ................................. | 56/11.6 |
| 5,155,985 | 10/1992 | Oshima et al. ............................ | 56/10.8 |
| 5,203,147 | 4/1993 | Long . | |
| 5,251,711 | 10/1993 | Meyer et al. . | |
| 5,261,214 | 11/1993 | Wollersheim ............................. | 56/11.3 |
| 5,343,678 | 9/1994 | Stuart . | |
| 5,375,674 | 12/1994 | Peter ....................................... | 180/19.3 |
| 5,511,367 | 4/1996 | Powers et al. ............................ | 56/11.8 |
| 5,542,241 | 8/1996 | Lydy et al. ................................ | 56/11.3 |
| 5,657,828 | 8/1997 | Nagamachi . | |
| 5,692,366 | 12/1997 | Hardesty .................................. | 56/11.2 |
| 5,701,967 | 12/1997 | Barnard .................................. | 180/19.3 |
| 5,803,847 | 9/1998 | Kamm ...................................... | 474/37 |

FOREIGN PATENT DOCUMENTS

| | | | |
|---|---|---|---|
| 595999 | 4/1960 | Canada .................................. | 56/11.6 |
| 0185513 | 6/1986 | European Pat. Off. . | |
| 2237566 | 2/1975 | France . | |
| 2734109 | 2/1979 | Germany . | |
| 741321 | 11/1955 | United Kingdom ..................... | 56/11.6 |

*Primary Examiner*—Thomas B. Will
*Assistant Examiner*—Arpad Fabian Kovacs
*Attorney, Agent, or Firm*—James W. Miller

[57] ABSTRACT

A handle for an outdoor power equipment unit, such as a lawn mower, includes a control system for allowing the user to manually vary the ground speed of the mower provided by a self propel system. The control system includes a handle grip on the handle that slides up and down relative to a lower portion of the handle. As the handle grip slides down, the ground speed increases. As the handle grip slides up, the ground speed decreases. A grab member can be used to allow the operator to have leverage in pushing the handle grip down.

33 Claims, 10 Drawing Sheets

GROUND SPEED CONTROL SYSTEM

TECHNICAL FIELD

This invention relates to an outdoor power equipment unit, such as a walk behind lawn mower, having a handle which the operator holds to guide the unit. More particularly, this invention relates to a control system on the handle for allowing the operator to manually control the ground speed of the unit.

BACKGROUND OF THE INVENTION

Rotary lawn mowers are known which comprise a wheeled housing, a rigid cutting blade rotatable in a cutting chamber in the housing, and a generally U-shaped handle extending upwardly and rearwardly from the housing for allowing an operator to guide and manipulate the mower. Many mowers of this type, as well as many other outdoor power equipment units, have a self propel drive system that propels the mower at a variable ground speed controlled by the operator. Typically, a pivotal ground speed control bail is provided on the handle of the mower. The bail can be pivoted from an open position towards a closed position with the degree of closure determining the ground speed of the mower.

Such pivotal bails to control ground speed are widely used. However, different mowers have bails that pivot in different ways with some pivoting from the top down and some from the bottom up. The operator must learn how to properly move and control the bail provided on the particular mower being operated. Moreover, to slow down a mower's ground speed, the operator must let up on the bail and let it return towards its open position. Since most operators tend to grip the handle tightly, and tend to keep the bail gripped in its closed position, letting up on just the bail to slow the mower down is not a natural action and must be learned.

At least one ground speed control system for an outdoor power equipment unit has been proposed which relies on pivotal motion of a portion of the handle, thereby doing away with the need for a separate pivotal control bail. In U.S. Pat. No. 4,835,949 to Seyerle, which is assigned to The Toro Company, the assignee of this invention, the top portion of the handle is pivotably connected to a lower portion of the handle. The operator pushes forwardly on the top portion of the handle as the operator grips the cross bar of the handle to increase the ground speed and pulls back on the top portion of the handle to decrease the mower ground speed.

While the Seyerle pivotal handle approach avoids the need for a separate pivotal control bail, it is still somewhat unnatural to use. Since the operator naturally pushes forwardly on the handle when directing the mower, this push would quickly move the pivotal portion of the handle to its forwardmost position where the ground speed is greatest. It is difficult to learn to pivot the handle just enough to reach a desired lower speed. Thus, the ground speed of a mower having this type of pivotal handle control system is very sensitive to the pivotal motion of the handle, making the mower jerky in use with the operator pushing forward or pulling back on the pivotal handle portion trying to find the right ground speed.

SUMMARY OF THE INVENTION

It is one aspect of this invention to provide a ground speed control system for an outdoor power equipment unit, such as a lawn mower, which is easy and intuitive to use.

One aspect of this invention comprises an outdoor power equipment unit having a housing suited for powered movement over the ground at a variable ground speed. A handle extends from the housing to allow an operator to walk behind the housing and hold the handle and thereby guide the housing during its movement over the ground. The handle includes a control member that slides up and down on the handle to decrease and increase the ground speed of the mower, respectively. In another aspect of this invention, this control member comprises the handle grip of the handle.

Another aspect of this invention comprises an outdoor power equipment unit having a housing suited for powered movement over the ground at a variable ground speed. A handle is connected to the housing. The handle has a lower handle portion that has a lower end connected to the housing and an upper handle portion that moves substantially parallel to an upper end of the lower handle portion to control the ground speed of the mower.

Yet another aspect of this invention comprises an outdoor power equipment unit having a housing suited for powered movement over the ground at a variable ground speed. A handle is connected to the housing. The handle has a selectively variable length which determines the ground speed of the mower, the longer the handle, the slower the ground speed, and vise versa.

An additional aspect of this invention comprises an outdoor power equipment unit having a housing suited for powered movement over the ground at a variable ground speed. A handle extends upwardly from the housing to allow an operator to hold the handle and thereby guide the housing during its powered movement over the ground. The handle includes at least one upwardly extending handle tube having a lower end connected to the housing. The handle further includes a handle grip which the user can grip with both hands to hold the handle, the handle grip being movably connected to an upper end of the at least one handle tube to operably control the ground speed of the housing. Finally, the handle includes a grab member carried on the upper end of the at least one handle tube in a position such that the user can grip the grab member with the user's fingers while the bottoms of the user's palms rest on the handle grip to thereby assist the user in moving the handle grip.

BRIEF DESCRIPTION OF THE DRAWINGS

This invention will be described hereafter in the Detailed Description, taken in conjunction with the following drawings, in which like reference numerals refer to like elements or parts throughout.

DETAILED DESCRIPTION

Figure 1:
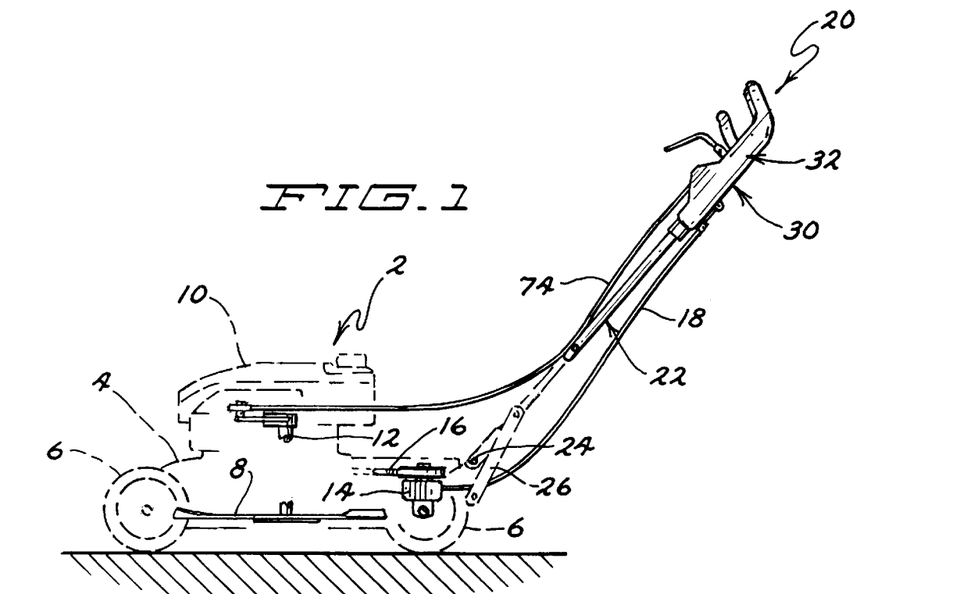
FIG. 1 is a side elevational view of an outdoor power equipment unit equipped with the ground speed control system of this invention, the ground speed control system being embodied in the handle used for guiding the housing of the outdoor power equipment unit.

A lawn mower is illustrated in FIG. 1 generally as 2. Lawn mower 2 includes a housing 4 supported for movement over the ground by a plurality of ground engaging wheels 6. Housing 4 includes a cutting chamber in which a cutting element, such as a cutting blade 8, is contained. When cutting blade 8 is rotated about a substantially vertical axis by a prime mover, such as an internal combustion engine 10, grass or other vegetation is cut at a height determined by the height of housing 4 above the ground.

Lawn mower 2 shown in FIG. 1 is self propelled at a variable speed over the ground. One or more of the ground engaging wheels 6 can be drivingly coupled to the shaft 12 of engine 10 through a transmission, shown generally at 14. Transmission 14 is preferably a single speed transmission. The input shaft of transmission 14 carries a pulley that is coupled to engine shaft 12 by a drive belt 16.

Transmission 14 can be progressively rocked back and forth relative to engine 10 to cause drive belt 16 to change from a slack to a taut condition. When drive belt 16 is slack, no power is transferred to transmission 14, or to the drive wheels of mower 2, such that the self propelling function is not activated. When drive belt 16 is taut, the input shaft of transmission 14 is being driven to the maximum extent possible by engine shaft 12 and transmission 14 is propelling housing 4 through the drive wheels at a maximum speed. At conditions in between the slack and taut conditions of drive belt 16, the drive wheels of mower 2 will be powered by transmission 14 at variable speeds determined by the degree of tautness of the belt, i.e. the tauter the belt, the higher the speed and vise versa. Thus, mower 2 shown in FIG. 1 is designed to be self-propelled at an infinitely variable speed up to some maximum speed, usually 3 to 4 mph.

The use of a rocking transmission 14 in conjunction with a drive belt 16 to provide a mower 2 with an infinitely variable speed is not new per se. Many prior lawn mowers manufactured and sold by The Toro Company, the assignee of this invention, have done this previously. What is different about this invention is the control system used to pull on the transmission cable 18 that rocks transmission 14 back and forth. While prior art mowers used a separate pivotal control bail to pull on transmission cable 18, this invention slides the upper portion of the mower handle downwardly to do this. The end result, as will be discussed more fully hereafter, is a control system which is much easier and more intuitive to use.

Transmission 14 need not be a single speed transmission, but could be a multi-speed transmission having various maximum speeds that can be separately selected by the operator, e.g. a transmission having three speed settings. Each speed setting allows the operator to change the maximum speed provided when drive belt 16 is taut, e.g. speed setting 1 provides a maximum speed of 2 mph, speed setting 2 provides a maximum speed of 3 mph, and speed setting 3 provides a maximum speed of 4 mph. However, once a particular speed setting has been selected, the rocking of transmission 14 is still used to infinitely vary the speed from zero up to the maximum speed provided by the selected speed setting. If speed setting 1 is used, then drive belt 16 when taut provides the maximum speed of 2 mph and less speed when drive belt 16 is slack.

Other ways of achieving a variable ground speed, other than by using a drive belt 16 and rocking transmission 14, could obviously be employed. Thus, the type of variable speed, self propel system used to power the drive wheels of housing 4 is not important to this invention.

Lawn mower 2 as shown in FIG. 1 is a walk behind lawn mower. This means that lawn mower 2 has a handle 20 that extends upwardly and rearwardly from housing 4. The operator can stand behind handle 20 and grip the top of handle 20 with his or her hands. When the operator grips handle 20 and walks forwardly, it is an aspect of this invention that mower 2 will drive forwardly at a speed closely matched to the walking speed of the operator. i.e. at a "personal pace" selected by the operator's own walking speed. The operator walks behind mower 2 holding onto handle 20 as mower 2 moves forwardly. The name "walk behind lawn mower" takes its meaning from the operator walking behind lawn mower 2 as he or she grips handle 20.

Handle 20 has a lower portion 22 that is connected at its lower end to housing 4. Lower portion 22 is normally connected to housing 4 by a pivot pin 24 so that the angle of inclination of handle 20 relative to housing 4 or relative to the ground can be varied. A locking bar 26 having a series of holes (not shown) that coact with a pin (not shown) on lower portion 22 of handle 20 is provided for locking or fixing lower portion 22 of handle 20 to housing 4 at a fixed, predetermined angle of inclination. Thus, in normal operation of mower 2, handle 20 does not pivot appreciably relative to housing 4 but maintains a fixed angle of inclination. While there may be a small amount of rotational play in handle 20, e.g. handle 20 can rotate a few degrees in either direction about pivot pin 24 due to looseness or play in pivot pin 24 and/or locking bar 26, the angle of inclination of handle 20 during use of mower 2 is intended to remain approximately constant.

Lower portion 22 of handle 20 preferably comprises two transversely spaced, upwardly extending, parallel handle tubes 28, one on either side of housing 4. Thus, the pivot pin 24 and locking bar 26 structure is duplicated on each side of housing 4 for each handle tube 28. Additionally, each handle tube 28 can be split to comprise a lower handle tube and an upper handle tube 28. Handle tubes 28 are split in this manner to allow handle 20 to be folded up with the upper handle tubes 28 extending forwardly across mower 2. Locking knobs (not shown) are provided on the pivots at the split points between the upper and lower handle tubes and to normally keep these tubes rigid and in line with one another during use of mower 2.

Handle 20 as described thus far is fairly typical of many prior art handles used on lawn mowers. The use of spaced upwardly extending handle tubes 28 which are split to allow handle 20 to be folded up, the pivot connection 24 of the lower ends of handle tubes 28 to housing 4, and the locking bar 26 that coacts with the handle tubes for adjusting the angle of inclination of handle tubes 28 have all been used on many prior Toro lawn mowers. This structure is well known to those skilled in the art. The description of this structure has been provided herein primarily for background purposes.

The improvement of this invention resides primarily in the upper portion 30 of handle 20, primarily in handle grip 32 of handle 20. In the control system of this invention, handle grip 32 of handle 20 is arranged to move substantially parallel to the lower, relatively fixed portion 22 of handle 20. In effect, handle grip 32 of handle 20 slides up and down on lower portion 22 of handle 20. This sliding motion is used to actuate and control the speed provided by the variable speed, self propel system of mower 2. No pivotal control bail is required to control the self propel system of mower 2.

Figure 3:
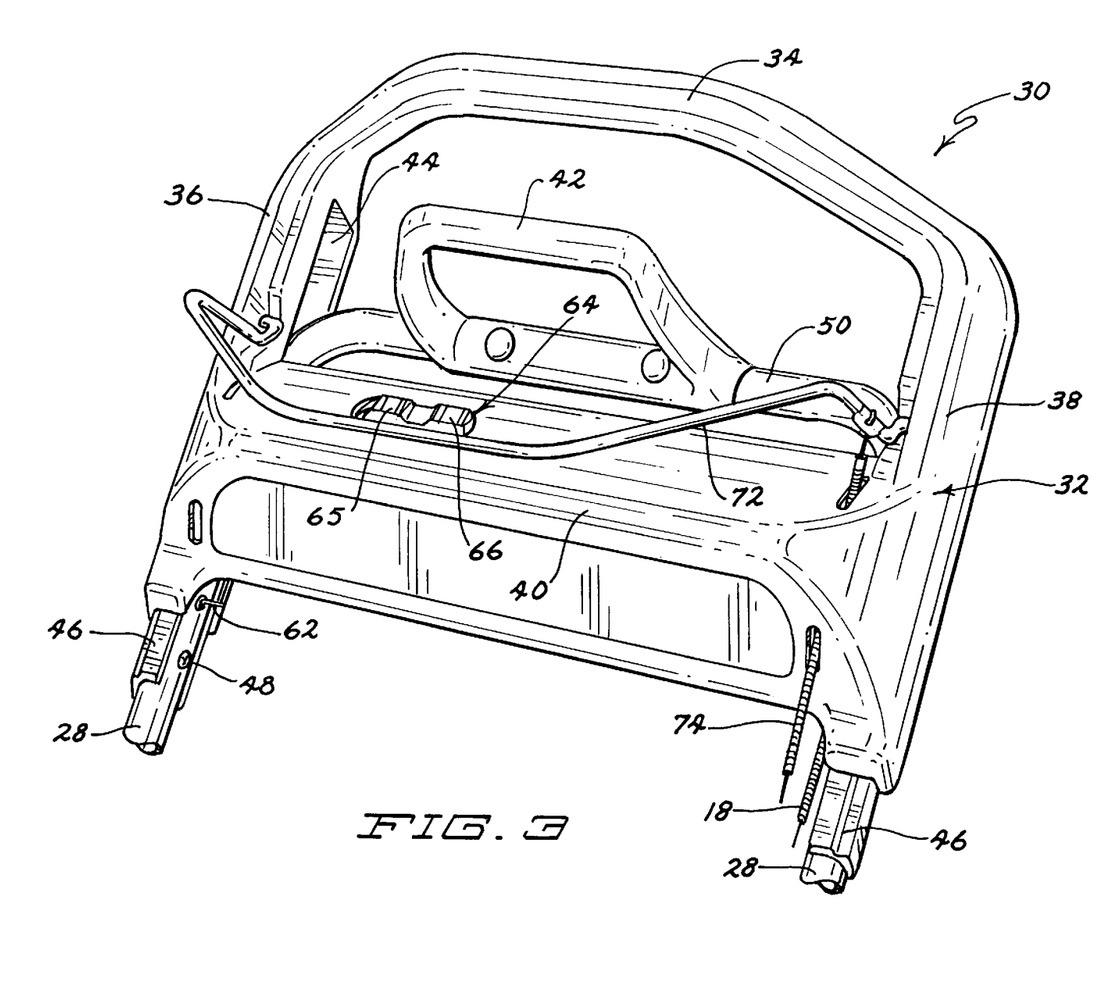
FIG. 3 is a perspective view of the control system of FIG. 1.

Referring now to FIG. 3, handle grip 32 of handle 20 includes a transverse cross bar 34 that connects the upper end of two downwardly extending legs 36 and 38 to provide a generally U-shaped handle grip. An escutcheon plate 40 is also provided extending between legs 36 and 38 of handle grip 32. Escutcheon plate 40 is spaced from cross bar 34 of handle grip 32 to allow a grab member 42 carried on lower portion 22 of handle 20 to be located therebetween. In any event, handle grip 32 is desirably formed as a single member molded out of plastic with the transverse cross bar 34, the two downwardly extending legs 36 and 38, and escutcheon plate 40 all being integrally formed with one another.

A longitudinal channel 44 is formed in each of legs 36 and 38 of handle grip 32 to be telescopically received on each of the spaced handle tubes 28 adjacent their upper ends. In order to reduce wear given the plastic material out of which handle grip 32 is formed, each handle tube 28, which is metallic, is preferably provided with a plastic slide bushing 46 fixed to handle tube 28 by various attachment screws 48. The inner surfaces of channels 44 in legs 36 and 38 are designed to mate with the outer crosssectional shapes of slide bushings 46. Thus, each leg 36 and 38 of handle grip 32 is slidably received on and in contact with one slide bushing 46 to slidably mount handle grip 32 on lower portion 22 of handle 20.

Figure 2:
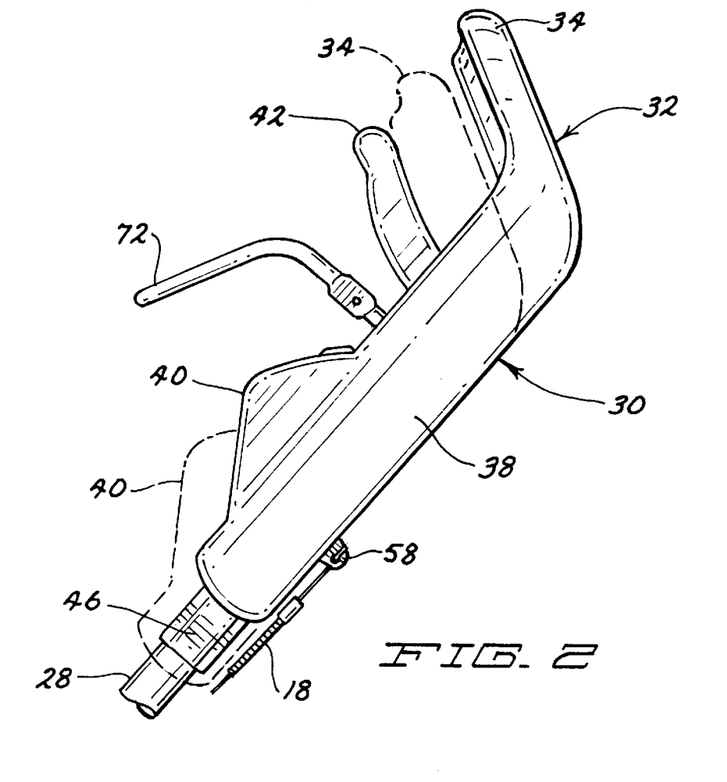
FIG. 2 is an enlarged side elevational view of the control system of FIG. 1.

The upper ends of handle tubes 28 are connected together by a cross brace 50 to which U-shaped grab member 42 is fixedly attached. Handle tube cross brace 50 is located within the plane of the longitudinal channels 44 of handle grip 32 to effectively be hidden within handle grip 32. Grab member 42 extends up from the central portion of handle tube cross brace 50 to be similar in height and shape to cross bar 34 of handle grip 32. See FIG. 2. The purpose of grab member 42 is to give the user something to place his or her fingers on while the bottoms of the user's palms are in contact with cross bar 34 of handle grip 32 to gain leverage in sliding handle grip 32 downwardly.

Figure 6:
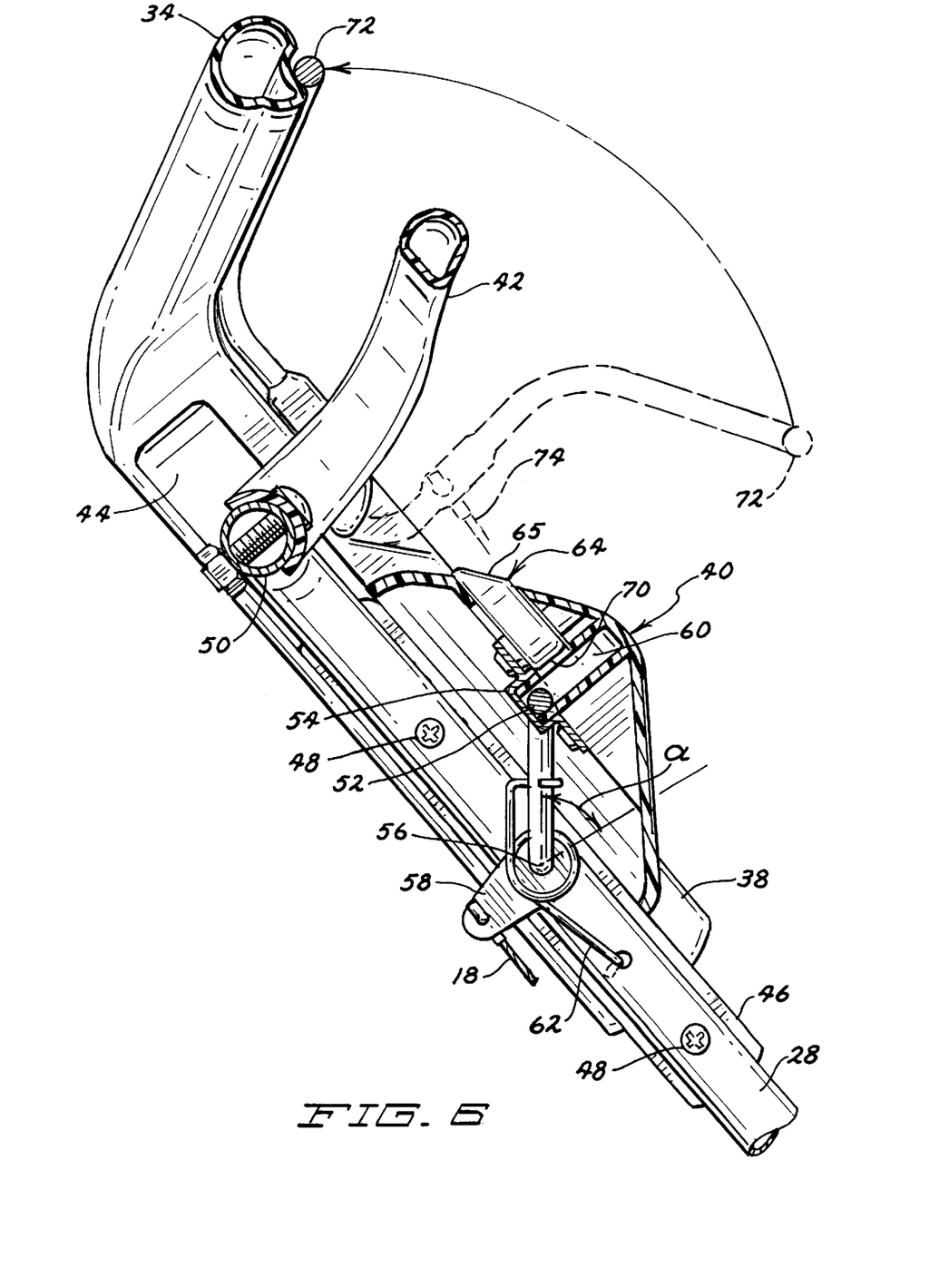
FIG. 6 is a cross-sectional view of the control system of FIG. 1, taken along lines 6—6 of FIG. 5, showing the slidable handle grip of the control system in its uppermost position where a minimum, i.e. a zero, ground speed has been selected.
Figure 7:
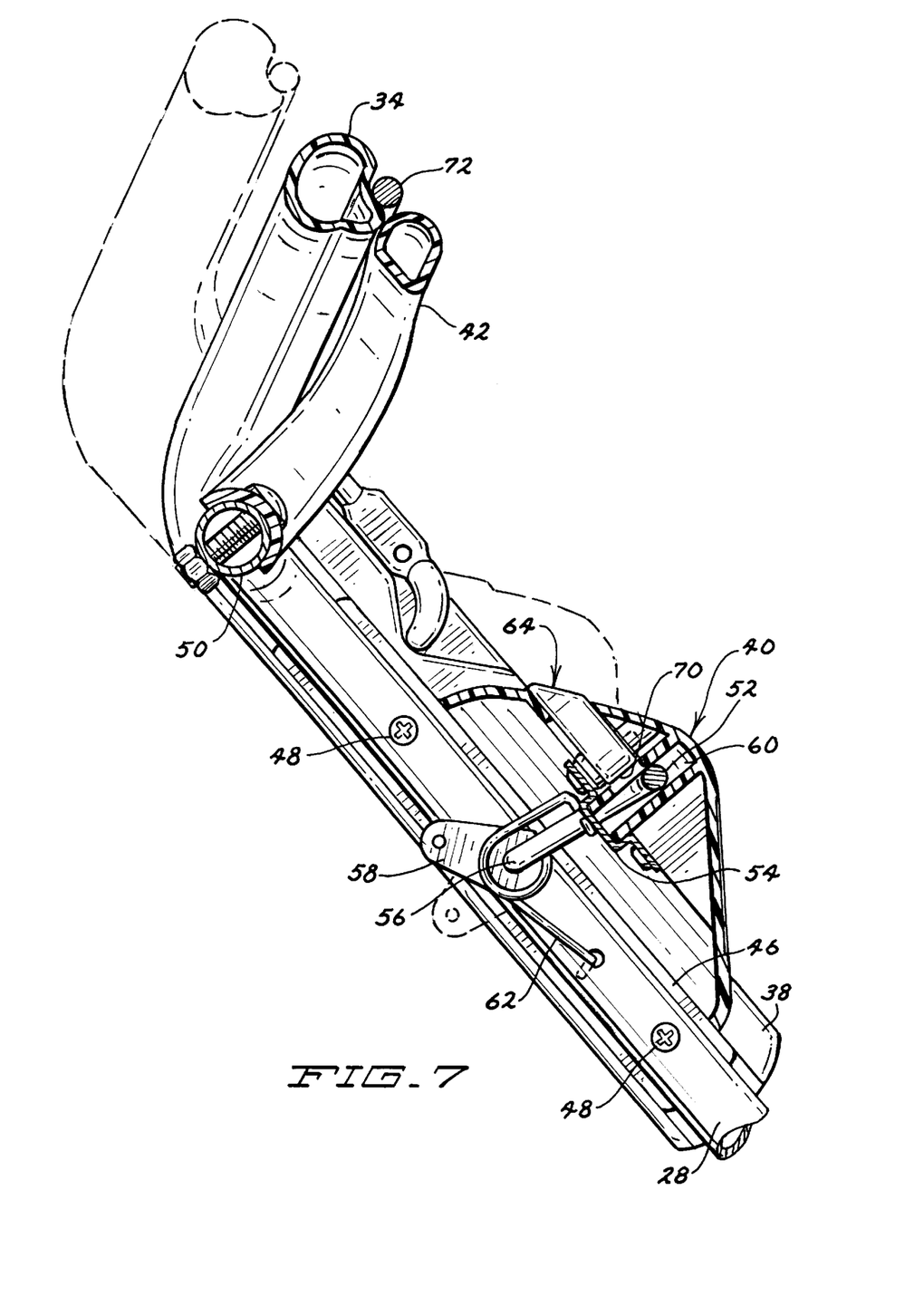
FIG. 7 is a cross-sectional view of the control system of FIG. 1 similar to FIG. 6, but showing the slidable handle grip of the control system in its lowermost position where a maximum ground speed has been selected.

Motion of handle grip 32 downwardly on handle tubes 28 pulls on transmission cable 18 that controls the variable speed self propel system. In the case of lawn mower 2 illustrated herein, sliding or pushing handle grip 32 downwardly pulls on cable 18 to rock transmission 14 to cause drive belt 16 to become tauter. When handle grip 32 has been pushed down as far as it can go, with cross bar 34 of handle grip 32 in contact with grab member 42, as shown in FIG. 7, transmission 14 has been rocked as far as it will go, drive belt 16 is taut, and mower 2 is being driven at its maximum speed. When handle grip 32 has not been pushed down at all and so is spaced away from grab member 42 as far as it will go, as shown in FIG. 6, transmission 14 has not been rocked, drive belt 16 is slack, and the ground speed of mower 2 is zero. The speed of mower 2 increases infinitely from zero to its maximum speed as handle grip 32 is moved or slid down from its FIG. 6 position towards its FIG. 7 position.

Figure 5:
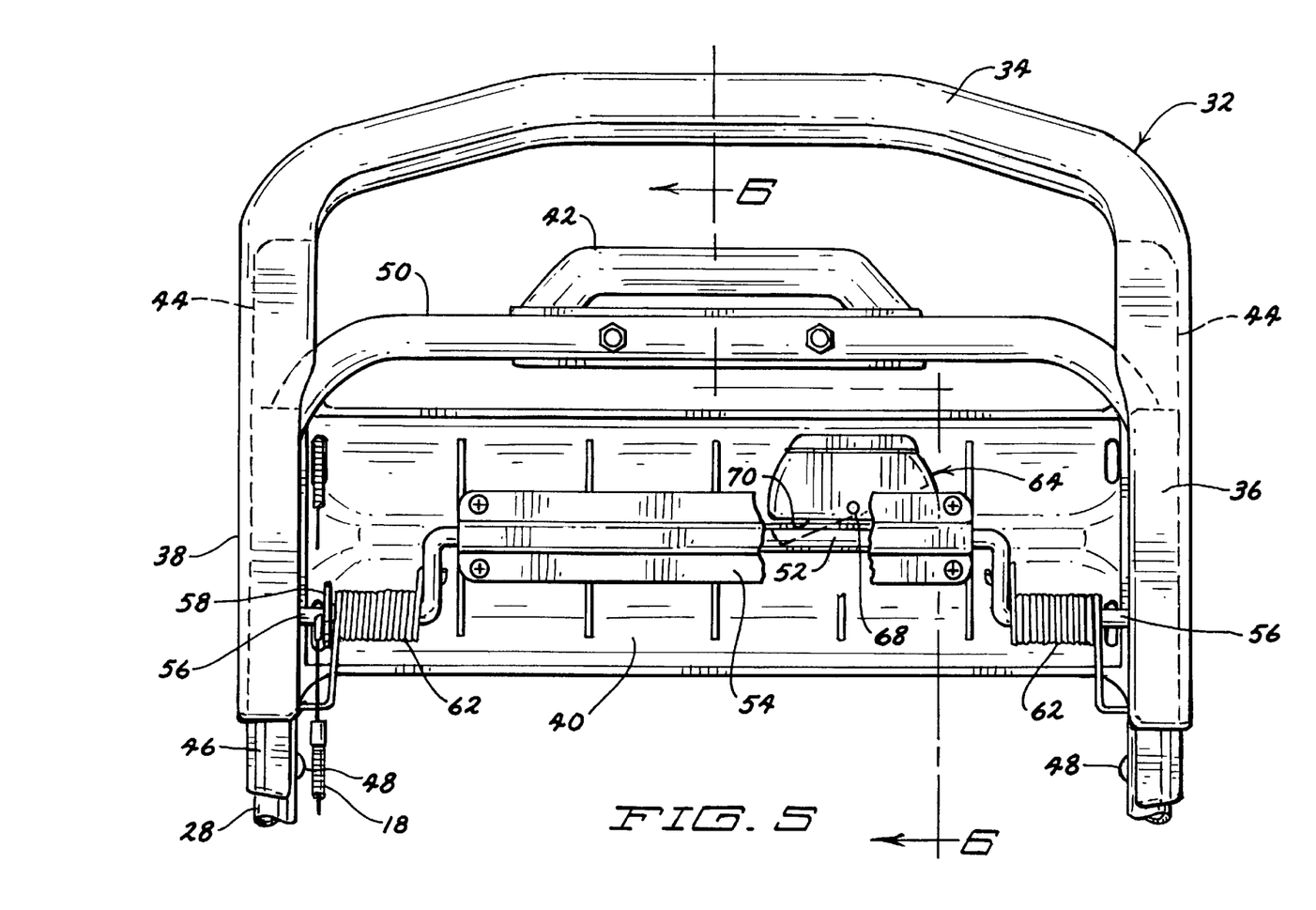
FIG. 5 is a bottom plan view of the control system of FIG. 1, particularly illustrating the pivot rod which converts sliding motion of the handle grip to a rotary motion that pulls on the transmission cable that controls ground speed.

Referring now to FIGS. 5 and 6, a pivot rod 52 is carried beneath escutcheon plate 40 above a retaining bracket 54. Pivot rod 52 has offset ends 56 which are rotatably journaled in the upper ends of handle tubes 28. Cable 18 that rocks transmission 14 to vary the ground speed of mower 2 is connected to a rotatable link or ear 58 on one of the offset ends 56 of pivot rod 52. Pivot rod 52 must pivot on handle tubes 28, to thereby rotate ear 58, to pull upwardly on transmission cable 18. It is this upward pull on transmission cable 18 that rocks transmission 14 in a direction to tighten drive belt 16 to thereby change the speed of the mower self propel system.

As shown in FIG. 6, the capture of pivot rod 52 between escutcheon plate 40 and the underlying bracket 54, together with the configuration of pivot rod 52 and its offset ends 56, allows the sliding motion of handle grip 32 to be converted to a rotary motion of pivot rod 52, and hence to a rotary motion of the cable attaching ear 58 on pivot rod 52. As handle grip 32 is slid downwardly, the central or captured portion of pivot rod 52 can rise vertically up into a vertical channel 60 that is provided on the underside of escutcheon plate 40. Compare FIG. 6 where no vertical movement of the central portion of pivot rod 52 has occurred to FIG. 7 where the central portion of pivot rod 52 has risen to its maximum possible extent inside channel 60. Vertical channel 60 and the rise in the central portion of pivot rod 52 is needed to allow pivot rod 52 to pivot about the pivot axis defined by the connection of offset ends 56 of pivot rod 52 to handle tubes 28. Accordingly, a suitable structure is provided whereby downward sliding motion of handle grip 32 serves to rotate ear 58 to which transmission cable 18 is attached, thereby providing the needed pull on transmission cable 18 to change the speed of mower 2.

Torsion springs 62 are provided surrounding each offset end 56 of pivot rod 52. One end of torsion spring 62 is attached to the adjacent handle tube 28. The other end of torsion spring 62 is wrapped around a portion of pivot rod 52. Torsion springs 62 provide a biasing force on handle grip 32 that normally causes handle grip 32 to be in its uppermost position of FIG. 6 in which the self propel system is not driving mower 2. Handle grip 32 has to be slid down against the bias provided by torsion springs 62 to actuate the self propel system and control the ground speed of mower 2.

One desirable function performed by pivot rod 52 is to allow handle grip 32 to slide smoothly up and down on handle tubes 28 given the manufacturing tolerances normally seen in these types of components. Without pivot rod 52, it would be possible to unintentionally cock handle grip 32 to one side or the other when sliding it downwardly, thereby potentially jamming or binding handle grip 32 during its movement. However, pivot rod 52, which runs across handle grip 32 and is carried on escutcheon plate 40, and the rotatable journalling of the offset ends 56 of pivot rod 52 on the fixed handle tubes 28, provides a degree of rigidity that resists twisting or cocking of handle grip 32 as it slides up and down. This helps ensure smooth and trouble free movement of handle grip 32.

A lock 64 is provided on escutcheon plate 40 for selectively locking out the sliding motion of handle grip 32. This is useful when starting a mower equipped with a starting rope (not shown) that runs back to handle 20 which rope must be manually pulled to start internal combustion engine 10 on mower 2. Usually, the operator places one hand on handle grip 32 and uses the other hand to pull or yank back on the starting rope. If handle grip 32 were free to move downwardly during this procedure, it would make this starting procedure more difficult. Accordingly, lock 64 lets the user manually lock handle grip 32 against sliding during a rope pull start.

Lock 64 also allows the operator to selectively change mower 2 into a non-powered or hand push mower. This can be useful for doing trimming around trees, bushes or obstructions. In such a trimming operation, it is sometimes easier to maneuver mower 2 when the self propel system is not driving mower 2 forwardly. Lock 64 would effectively allow the operator to keep the self propel system in an off condition if so desired when trimming or at any other time when drive to the wheels is not desired.

Figure 4:
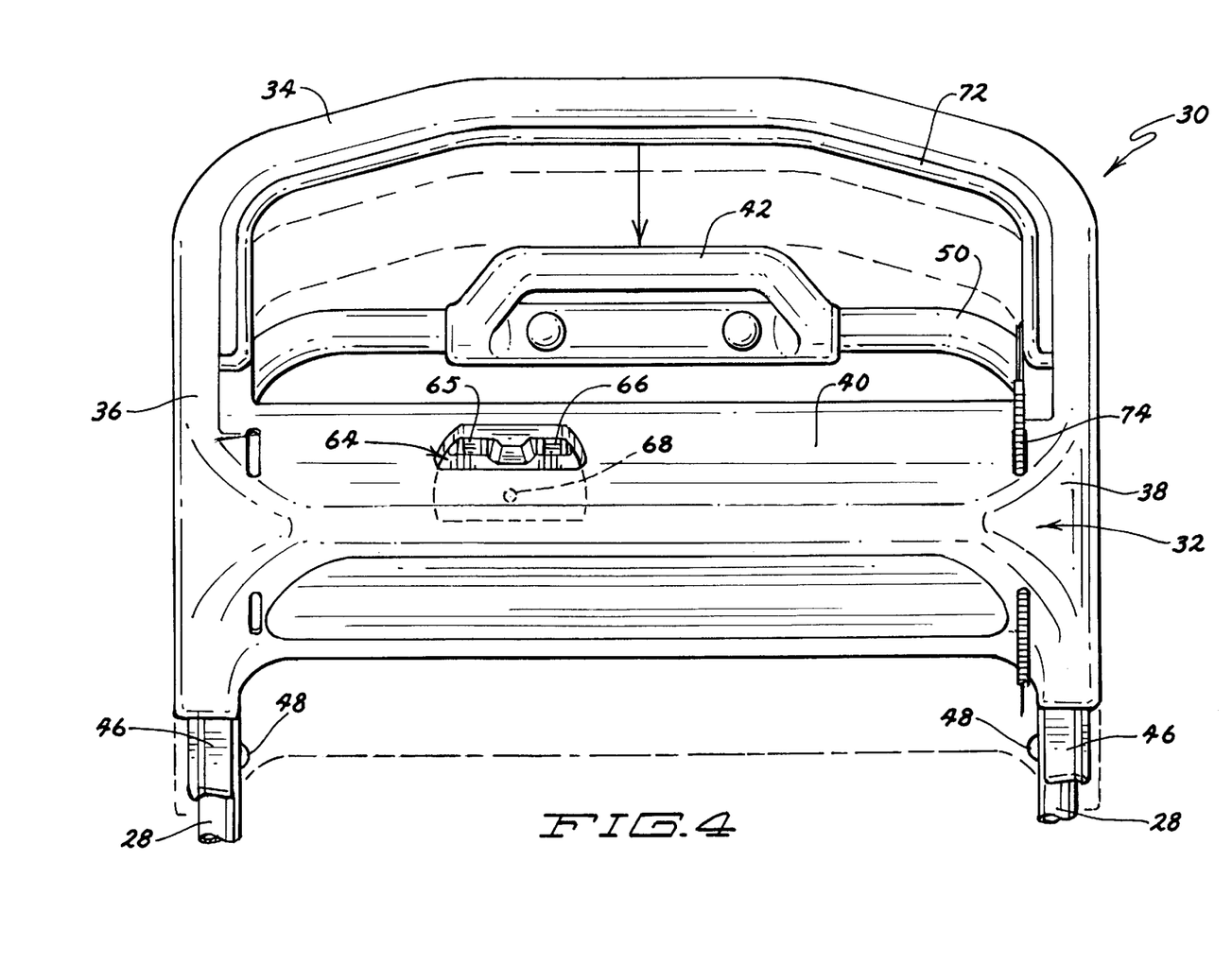
FIG. 4 is a top plan view of the control system of FIG. 1, showing the control system in solid lines in a position in which a zero ground speed has been selected and in phantom lines in which a maximum ground speed has been selected, and further showing the sliding motion of the handle grip used to vary the ground speed.

Referring to FIGS. 4 and 5, lock 64 is a toggle type lock located beneath escutcheon plate 40 but has two actuation buttons 65 and 66 protruding through the top of escutcheon plate 40. Lock 64 pivots in opposite directions about a pivot 68 depending upon which actuation button is pushed down. Referring now to FIG. 5, lock 64 has a locking edge 70 on one side of pivot 68.

When one button 65 is pushed down, lock 64 is disengaged with locking edge 70 of lock 64 being slid out of vertical channel 60 in which the central portion of pivot rod 52 must rise. See FIG. 7 and the solid line position of locking edge 70 in FIG. 6. However, if lock 64 is to be engaged, the other button 66 on escutcheon plate 40 can be pushed down to rotate lock 64 about pivot 68 and thereby rotate locking edge 70 into vertical channel 60. See the dotted line position of locking edge 70 in vertical channel 60 in FIG. 6. This prevents pivot rod 52 from rising in vertical channel 60 and effectively locks handle grip 32 in its uppermost position as shown in FIG. 6. After starting and during normal operation of mower 2 with engine 10 running, lock 64 would be disengaged by pushing down on the other button 65 of lock 64 to keep locking edge 70 retracted out of vertical channel 60 in which the central portion of pivot rod 52 must rise, thereby freeing handle grip 32 for its sliding movement.

Most mowers have a separate control bail for controlling the operation of the blade, usually by requiring that the bail be closed before engine 10 can be started. Thus, an engine control bail 72 is pivotally mounted on handle grip 32 in a position in which engine control bail 72 can be pivoted back against cross bar 34 of handle grip 32 to reach the closed or engine starting position. Engine control bail 72 is shaped to clear grab member 42 as shown in FIG. 6. Engine control bail 72 is attached by a cable 74 that leads to an engine kill switch or blade brake clutch system (BBC) on mower 2.

In any event, to start mower 2, the engine kill switch has to be closed by pivoting engine control bail 72 to its closed position against cross bar 34 of handle grip 32. This is illustrated in FIG. 6 by engine control bail 72 moving from its phantom line position to its solid line position. When engine control bail 72 is in its solid line position in FIG. 6, pulling on the starting rope will start internal combustion engine 10 to begin rotation of the cutting blade of mower 2. If the operator releases engine control bail 72 during operation of mower 2, the engine kill switch will be opened, thereby shutting off engine 10 and stopping the rotation of the blade. Instead of controlling the operation of an engine kill switch, engine control bail 72 in a BBC equipped mower would actuate a clutch (not shown) placing the blade into operation when bail 72 is closed and would deactuate the clutch and actuate a brake (not shown) stopping operation of the blade when bail 72 is released and returns towards its open position.

Engine control bail 72 will move up and down with handle grip 32 as handle grip 32 is slid up and down. This will not affect the operation of the kill switch. As long as engine control bail 72 is kept closed against cross bar 34 of handle grip 32, engine 10 will keep running if it has been started. Engine 10 is stopped only by releasing engine control bail 72 and letting it pivot relative to handle grip 32 back to its forward position shown in phantom in FIG. 6. This can be done in any position of handle grip 32.

Assuming engine 10 of mower 2 is running, the control system of this invention allows the ground speed of mower 2 to be varied in a very unique and intuitive manner. It is done, of course, by gripping handle 20 and walking forwardly which naturally pushes down on handle grip 32 of handle 20 to slide handle grip 32 downwardly on handle tubes 28. The faster the operator walks and the further handle grip 32 is slid downwardly, the more transmission cable 18 is pulled, and the faster mower 2 moves. This is true all the way up to the maximum speed of mower 2, which is reached when cross bar 34 of handle grip 32 of mower 2 is abutted up against grab member 42 as shown in FIG. 7. Other stops for limiting the maximum forward speed of mower 2 could be used in place of the abutment between grab member 42 and cross bar 34.

The ease of use and intuitive nature of this control system follows from the fact that the needed sliding motions of handle grip 32 mimic the natural instincts of the operator when operating a self propelled, variable speed lawn mower. For example, when most operators want a lawn mower to move faster, they naturally walk a bit faster which pushes forwardly harder on handle 20, whether consciously or unconsciously. In the control system of this invention, the resulting forward push on handle 20 slides handle grip 32 of the control system downwardly to increase the ground speed of mower 2. Thus, walking faster and thus pushing harder on handle 20 yields an increased speed of mower 2, which is precisely the desired result.

Conversely, when confronted with a mower that is going faster than one would like, the natural instinct of most operators would be to walk slower which results in pulling back on handle 20. When this is done using the control system of this invention, handle grip 32 is slid back up handle tubes 28 to decrease the ground speed of mower 2. Even if the operator does not consciously walk slower or pull back on handle 20, a mower that speeds up and begins to move away from the operator will on its own accord cause handle grip 32 to move back up handle tubes 28 as long as the operator lets it. Again, the operator gets precisely the result he or she intended or needs, namely mower 2 slows down.

Thus, the control system of this invention provides almost an automatic regulation of the ground speed that enhances the ease of use of mower 2. To go faster, one simply walks faster which pushes a bit harder on handle grip 32 of handle 20 and mower 2 goes faster. To slow down, one simply walks slower which pulls back a bit on handle grip 32. As noted earlier, a mower beginning to go too fast naturally causes handle grip 32 to move back up handle tubes 28 since lower portion 22 of handle tubes 28 accelerate away from handle grip 32 in this condition. Mower 2 will slow down in this condition even without conscious operator intervention. Accordingly, this control system is able to vary the ground speed of mower 2 in an almost effortless manner. Mower 2 is driven forwardly at a ground speed that has a "personal pace" that is matched to the walking speed of the operator.

Figure 11:
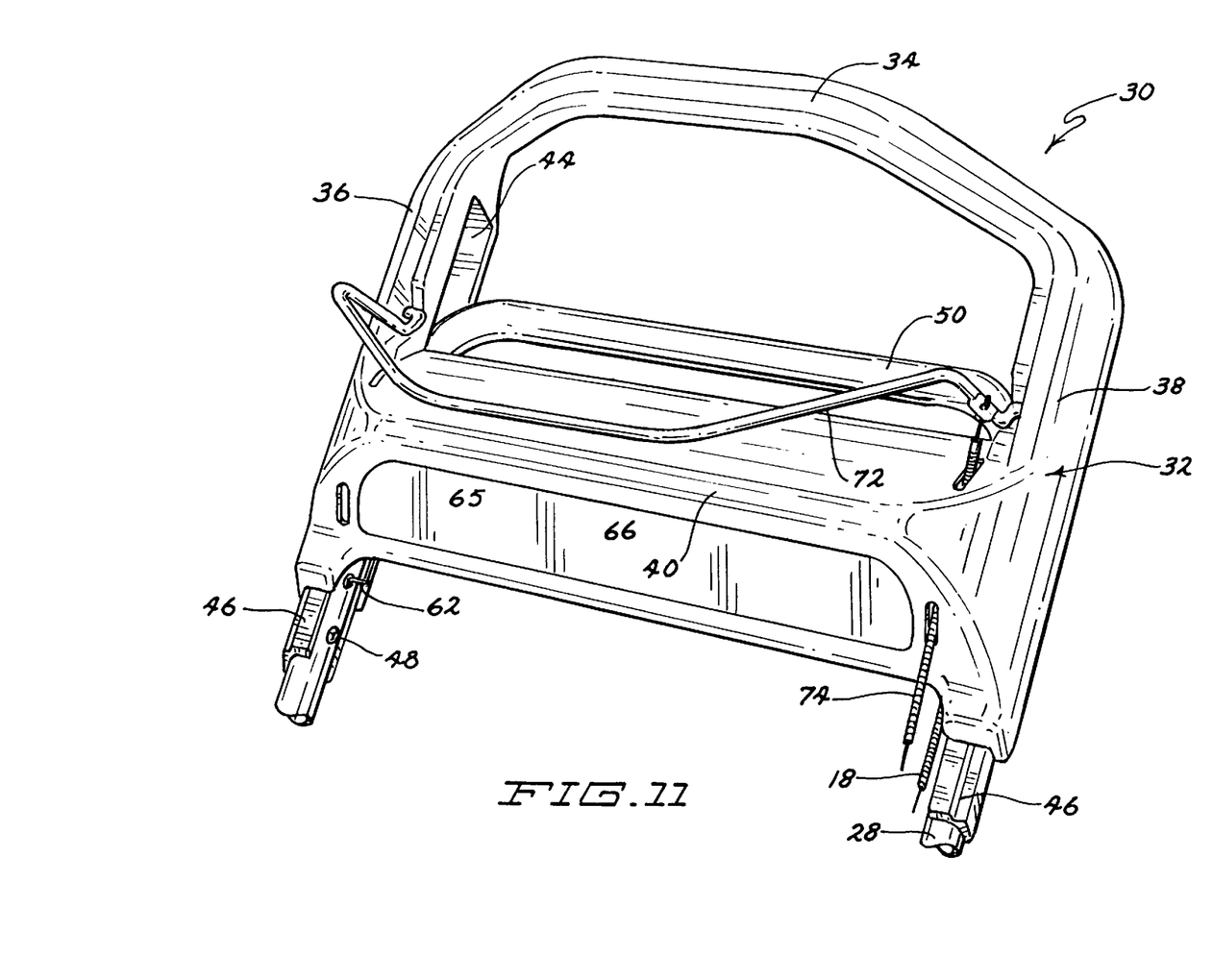
FIG. 11 is a perspective view of a fourth embodiment of the control system of this invention with FIG. 11 being similar to FIG. 3, the fourth embodiment of the control system having no grab member on the handle tube cross brace.
Figure 12:
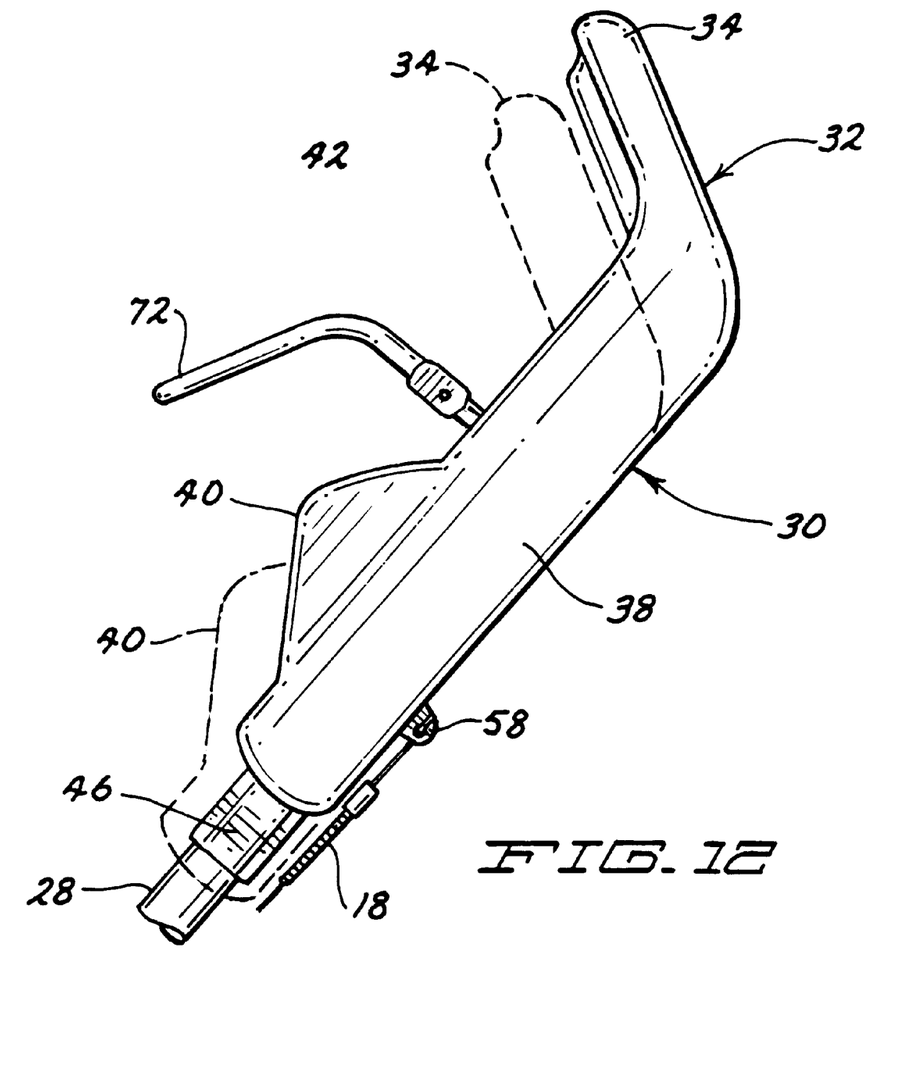
FIG. 12 is an enlarged side elevational view of the control system of FIG. 11.

The presence of grab member 42 on mower 2, while preferred, is not strictly necessary. Grab member 42 allows the user to reach forwardly and grip grab member 42 with the user's fingers while the bottom portions of the user's palms remain in contact with cross bar 34 of handle grip 32. This provides leverage and lets the user more positively slide handle grip 32 downwardly, which is particularly useful in certain conditions, such as when going uphill with mower 2. In addition, grab member 42 allows the operator to override the "personal pace" setting that would normally result from the operator's walking speed since grab member 42 allows the operator to hold handle grip 32 further forwardly than the position of handle grip 32 that would occur resulting from the operator's walking speed. However, the slidable handle grip 32 of this invention could be used without having a grab member 42 to grip if so desired as illustrated in FIGS. 11 and 12.

Figure 8:
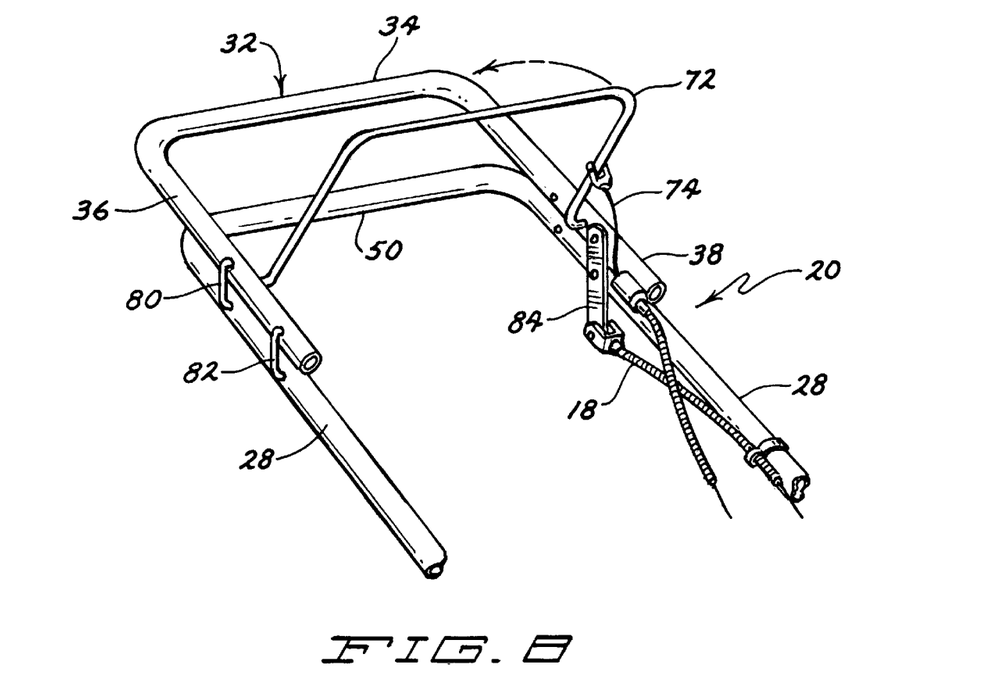
FIG. 8 is a perspective view of a second embodiment of the control system of this invention, showing the control system in a position in which a zero ground speed has been selected.
Figure 9:
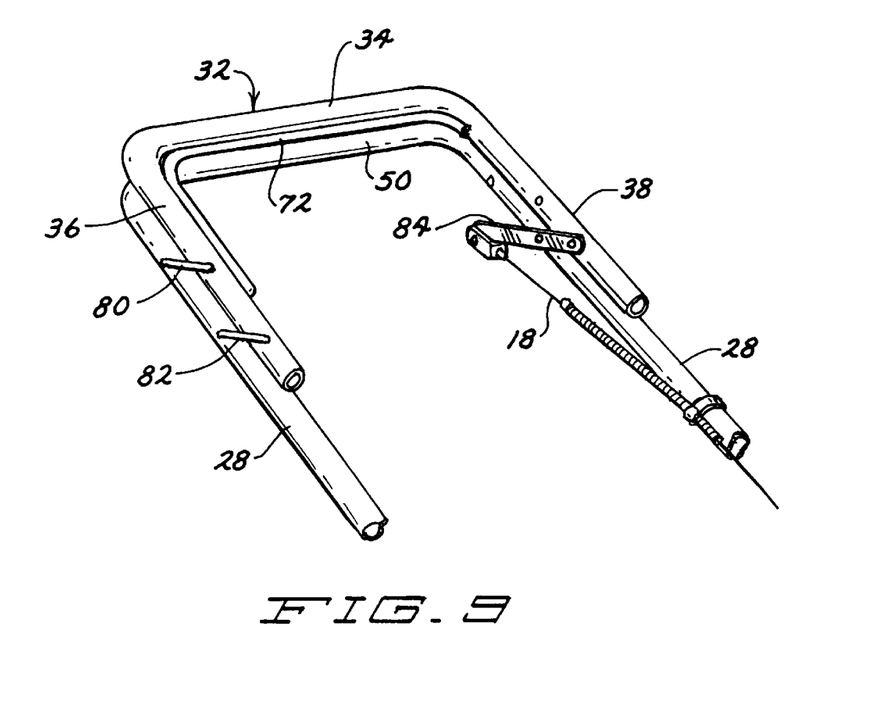
FIG. 9 is a perspective view of a second embodiment of the control system of this invention, showing the control system in a position in which a maximum ground speed has been selected.

Other ways can be used to slidably mount handle grip 32 instead of using a telescopic sliding fit between handle grip 32 and handle tubes 28. One such way, but not the only way, is shown in FIG. 8. In this embodiment, a parallelogram linkage is used between each leg 36 and 38 of handle grip 32 and each handle tube 28. The parallelogram linkage formed by the two links 80 and 82 is shown on one side of handle 20 with an identical parallelogram linkage being used on the other side of handle 20. In the embodiment of FIG. 8, cross brace 50 is in a plane close to that of cross bar 34 and could function as a grab member if so desired.

In the operation of the FIG. 8 embodiment, pushing down on cross bar 34 of handle grip 32 will effectively slide handle grip 32 down over handle tubes 28 of lower portion 22 of handle 20. As this occurs, a pivot link 84 that is fixed at one end to handle grip 32 and is pivoted on one of the handle tubes 28 simply rotates to pull on transmission cable 18. Thus, the FIG. 8 embodiment is a somewhat simplified version of a control system according to this invention utilizing a slidable handle grip 32 for controlling the ground speed of mower 2. If so desired, a relatively rigid tube or rod (not shown) could be used as a cross brace extending across handle grip 32, e.g. extending between one set of the opposed links 80 or 82 on opposite sides of handle grip or extending between the legs 36 and 38 of handle grip 32, to add rigidity to handle grip 32 and ensure ease of sliding.

The term slidable handle grip 32, or the use of the verb "slide" to describe the motion of handle grip 32, is meant to include a longitudinal movement or bodily shifting of handle grip 32 relative to the upper ends of handle tubes 28 as opposed to a strictly pivoting motion. Such a longitudinal movement or bodily shifting of handle grip 32 is accomplished using a substantially parallel motion of handle grip 32 relative to the upper ends of handle tubes 28. This motion is provided by both of the embodiments of the control system disclosed in this application, even though handle grip 32 in the FIG. 8 embodiment might also rise and fall slightly relative to handle tubes 28 as it slides back and forth relative to handle tubes 28.

Thus, the "sliding" motion contemplated herein is one where the orientation of handle grip 32 in the user's hands remains substantially constant as handle grip 32 slides in the sense that a reference point on the top of handle grip 32 remains on the top of handle grip 32 in substantially the same relative position relative to the user's hands over the range of sliding motion. In contrast, with a pivoting control bail or control member, the portion of the bail gripped by the user changes its orientation relative to the user's hands as it pivots so that a reference point that is initially at the top of the bail when pivoting begins will be rotated relative to the user's hands by the number of degrees of rotation. If the bail pivots 90°, a reference point that was initially on the top of the bail will now be on the front or rear of the bail such that the portion of the bail the user grips has rotated 90° within the user's grip.

The sliding motion of handle grip of handle 20 provides a handle 20 that has a variable length. When handle 20 is longest, i.e. when slidable handle grip 32 is in its uppermost position as shown in FIGS. 6 or 8, mower 2 has its lowest ground speed. When handle 20 is shorter, i.e. when slidable handle grip 32 has been moved downwardly from its uppermost position, mower 2 has a higher ground speed. Thus, the control system of this invention effectively provides a variable length handle whose length at any given instant of time determines the ground speed of mower 2.

It is preferred that the movable control member that controls the ground speed of mower 2 comprise handle grip 32 of handle 20. Handle grip 32 is that portion of handle 20 that the user grips and holds with at least one hand when guiding and directing mower 2. It is not necessary that handle grip 32 have a long cross bar 34 that is long enough to be gripped by both of the user's hands. Instead, a slidable handle grip that is long enough to be gripped by only one of the user's hands, which shorter handle grip would still employ the unique and novel sliding motions of handle grip 32 which relate to this invention, would form a part of this invention and be covered hereby. With such a one-handed, slidable handle grip, mower 2 would be provided with at least one other fixed member or grip that the user could grip and hold with his or her other hand.

Figure 10:
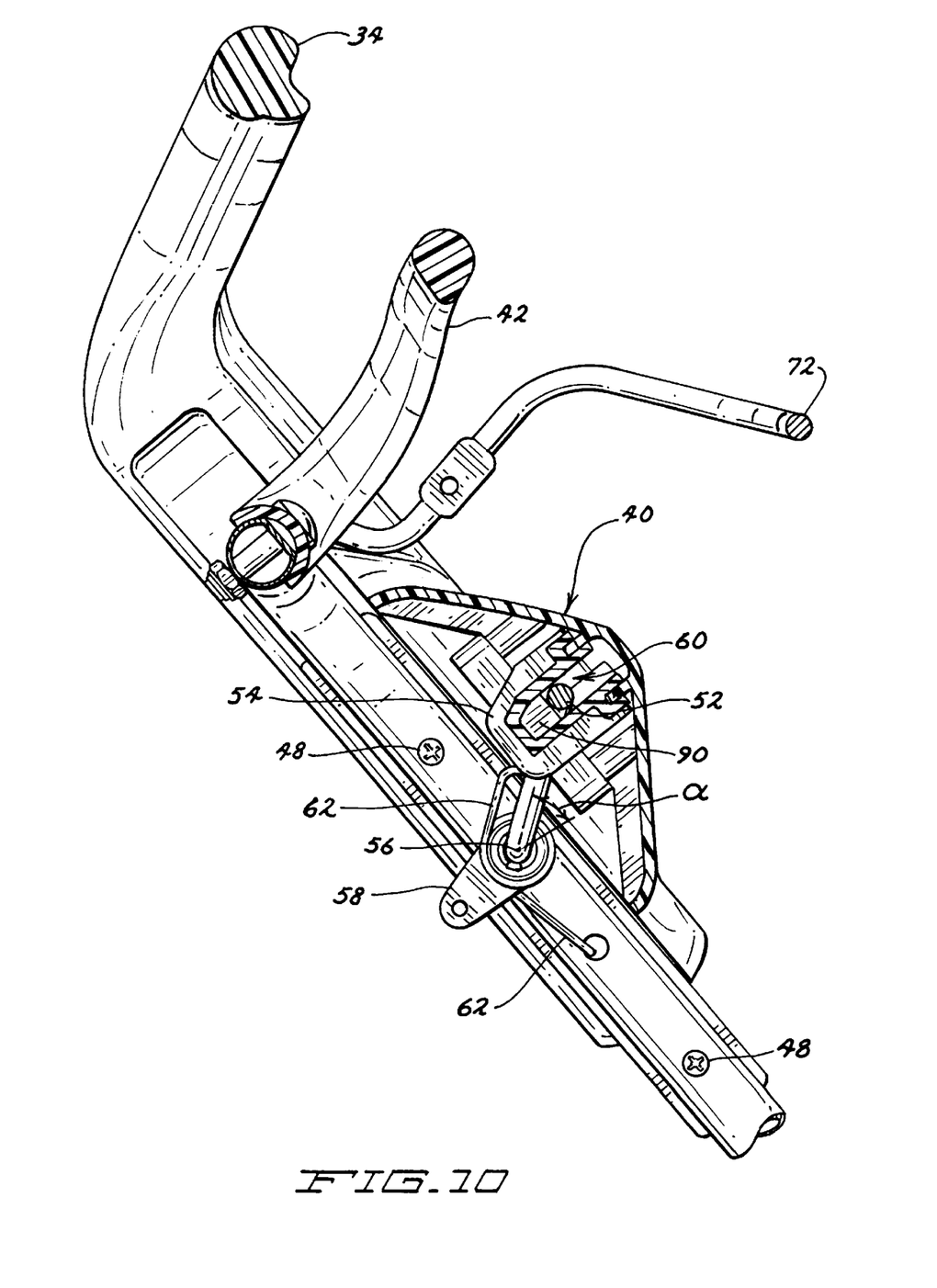
FIG. 10 is a cross-sectional view of a third embodiment of the control system of this invention with FIG. 10 being similar to FIG. 6, the third embodiment of the control system having no lock to prevent sliding motion of the handle grip and having a slightly different geometry of the pivot rod.

While the presence of lock 64 provides various operational characteristics, lock 64 is not essential to this invention and can be deleted without departing from this invention. FIG. 10 illustrates an embodiment of the invention in which lock 64 has simply been removed from escutcheon plate 40.

Referring further to FIG. 10, vertical channel 60 and bracket 54 are now made as a single, integrally molded, plastic piece that is simply screwed into various bosses formed on the underside of escutcheon plate 40. A plurality of ribs 90 are provided on the bottom of channel 60 to change the geometry of pivot rod 52 when slidable handle grip 32 is in its uppermost position. The central or captured portion of pivot rod 42 can no longer fall all the way to the bottom of channel 60. Thus, in FIG. 10, the central or captured portion of pivot rod 42 is now offset at an angle $\alpha$ of only approximately 30°–35° from a plane that passes through the ends 56 of pivot rod 52 and is perpendicular to handle tubes 28 instead of the approximately 50° value of $\alpha$ that is shown in FIG. 6 with respect to the first embodiment. Lowering the angle a of pivot rod 52 as shown in FIG. 10 lowers the forces required to slide handle grip 32 up and down. Thus, adjusting the angle a of pivot rod 52 can be used to adjust the force required to slide handle grip 32 to any desired value.

Various modifications of this invention will be apparent to those skilled in the art. For example, the control system of this invention is not limited for used with a self propelled lawn mower, but could be used with any outdoor power equipment unit having a component or system that needs to be controlled, such as a variable speed, self propel system. Grab member 42 could have multiple positions on cross brace 50 of handle tubes 28 to vary its distance from the uppermost position of handle grip 32, to thereby provide a way to change or adjust the maximum speed of mower 2 reached when handle grip 32 abuts against grab member 42. Accordingly, the invention is to be limited only the by the appended claims.

We claim:

1. An outdoor power equipment unit, which comprises:
   (a) a housing having a self propel system to provide the housing with powered movement over the ground at a variable ground speed; and
   (b) a handle extending from the housing to allow an operator to walk behind the housing and hold the handle and thereby guide the housing during its movement over the ground, the handle including a handle grip that slides up and down on the handle to decrease and increase the ground speed of the outdoor power equipment unit, respectively, wherein the slidable handle grip of the handle includes a transverse cross bar that is sufficiently long to allow both of a user's hands to grip the cross bar.

2. An outdoor power equipment unit as recited in claim 1, wherein the transverse cross bar of the handle grip of the handle forms an uppermost portion of the handle.

3. An outdoor power equipment unit as recited in claim 1, further including a lock for selectively locking out the sliding motion of the handle grip of the handle.

4. An outdoor power equipment unit as recited in claim 1, wherein the handle also includes a lower portion having a lower end connected to the housing, the handle grip of the handle sliding up and down on an upper end of the lower portion of the handle.

5. An outdoor power equipment unit as recited in claim 4, wherein the lower portion of the handle includes at least one elongated handle tube extending upwardly and rearwardly from the housing.

6. An outdoor power equipment unit as recited in claim 4, wherein the upper end of the lower portion of the handle includes a grab member which a user can grip with the user's fingers when the bottoms of the user's palms are resting on the handle grip to provide leverage in sliding the handle grip down or up.

7. An outdoor power equipment unit as recited in claim 6, wherein the grab member is located to interfere with the downward sliding motion of the handle grip to provide a stop which provides a maximum ground speed when the handle grip is located adjacent the grab member.

8. An outdoor power equipment unit as recited in claim 6, wherein the handle grip includes a transverse escutcheon plate separated from the transverse cross bar to define a gap therebetween, and wherein the grab member is located in the gap between the cross bar and the escutcheon plate.

9. An outdoor power equipment unit as recited in claim 4, wherein the lower portion of the handle includes at least one upwardly extending metallic tube, wherein the handle grip is formed of plastic, and further including a plastic slide bushing fixed to an upper end of the metallic tube and shaped to mate with a longitudinal channel in the plastic handle grip such that the plastic handle grip slides back and forth on the plastic slide bushing.

10. An outdoor power equipment unit as recited in claim 1, wherein the handle includes a lower portion having a lower end thereof connected to the housing, and wherein the handle grip has a parallelogram connection to an upper end of the lower portion of the handle to allow the handle grip to slide relative to the lower portion of the handle.

11. An outdoor power equipment unit as recited in claim 1, further including at least one spring for biasing the handle grip upwardly.

12. An outdoor power equipment unit as recited in claim 1, wherein the housing includes a cutting chamber containing a rotary cutting blade such that the outdoor power equipment unit is a lawn mower.

13. An outdoor power equipment unit, which comprises:
   (a) a housing having a self propel system to provide the housing with powered movement over the ground at a variable ground speed; and
   (b) a handle connected to the housing, wherein the handle has a selectively variable length, wherein the handle can be extended to a maximum length from which the handle cannot be made longer, wherein the handle can be selectively collapsed from the maximum length thereof into various lengths which can only be shorter than the maximum length; and
   (c) wherein the handle is operably connected to the self propel system such that the length of the handle controls the around speed of the outdoor power equipment unit, the traction system being disengaged with the around speed of the outdoor power equipment unit being zero when the handle is extended into its maximum length, the traction system becoming engaged and the around speed of the outdoor power equipment unit progressively increasing from zero as the length of the handle is progressively collapsed from the maximum length of the handle into shorter lengths of the handle.

14. An outdoor power equipment unit as recited in claim 13, wherein the housing includes a cutting chamber containing a rotary cutting blade such that the outdoor power equipment unit is a lawn mower.

15. An outdoor power equipment unit, which comprises:
   (a) a housing having a self propel system to provide the housing with powered movement over the ground at a variable ground speed; and
   (b) a handle extending upwardly from the housing to allow an operator to hold the handle and thereby guide the housing during its powered movement over the ground, the handle including:
      (i) two transversely spaced, upwardly extending handle tubes each having a lower end connected to one side of the housing;
      (ii) a U-shaped handle grip comprising a transverse cross bar having two transversely spaced, downwardly extending legs, wherein each of the legs of the handle grip is movably connected to an upper end of one of the handle tubes in a manner that permits the handle grip to move back and forth relative to the upper end of the handle tubes in a motion which is substantially parallel to the upper end of the handle tubes, and wherein the substantially parallel motion of the handle grip operably controls the ground speed of the housing.

16. An outdoor power equipment unit as recited in claim 15, wherein each of the legs of the handle grip is telescopically slidable on the upper end of one of the handle tubes.

17. An outdoor power equipment unit as recited in claim 15, wherein each of the legs of the handle grip is connected by a parallelogram linkage to the upper end of one of the handle tubes.

18. An outdoor power equipment unit as recited in claim 15, wherein a grab member is fixed to an upper end of the handle tubes to be located below the transverse cross bar of the handle grip.

19. An outdoor power equipment unit as recited in claim 18, wherein the upper ends of the handle tubes are connected together by a cross brace, and wherein the grab member is mounted on the cross brace and extends upwardly therefrom.

20. An outdoor power equipment unit as recited in claim 15, further including a lock for selectively preventing motion of the handle grip.

21. An outdoor power equipment unit as recited in claim 15, further including a relatively rigid rod located below the transverse cross bar with the relatively rigid rod extending transversely across the handle grip to help resist twisting of the handle grip as the legs of the handle grip slide up and down on the upper ends of the handle tubes.

22. An outdoor power equipment unit as recited in claim 15, wherein the housing includes a cutting chamber containing a rotary cutting blade such that the outdoor power equipment unit is a lawn mower.

23. An outdoor power equipment unit, which comprises:
    (a) a housing having a self propel system to provide the housing with powered movement over the ground at a variable ground speed; and
    (b) a handle extending upwardly from the housing to allow an operator to hold the handle and thereby guide the housing during its powered movement over the ground, the handle including:
        (i) at least one upwardly extending handle tube having a lower end connected to the housing;
        (ii) a handle grip which the user can grip with both hands to hold the handle, the handle grip being movably connected to an upper end of the at least one handle tubes to operably control the ground speed of the housing, wherein the handle grip slides back and forth in a substantially parallel motion relative to the upper end of the at least one handle tube; and
        (iii) a grab member carried on the upper end of the at least one handle tube in a position such that the user can grip the grab member with the user's fingers while the bottoms of the user's palms rest on the handle grip to thereby assist the user in moving the handle grip.

24. An outdoor power equipment unit as recited in claim 23, wherein the housing includes a cutting chamber containing a rotary cutting blade such that the outdoor power equipment unit is a lawn mower.

25. An outdoor power equipment unit, which comprises:
    (a) a housing suited for movement over the ground;
    (b) a handle extending upwardly from the housing to allow an operator to hold the handle and thereby guide the housing during its movement over the ground, the handle including at least one upwardly extending handle tube having a lower end connected to the housing;
    (c) a control member slidably mounted on the handle tube;
    (d) a pivot rod having a first portion carried on the control member and at least one offset end portion rotatably journalled on the handle tube, the first portion of the pivot rod being slidable up and down relative to the control member as the control member is slid on the handle tube to convert the sliding motion of the control member to rotary motion of the pivot rod about its offset end portion;
    (e) a link carried on the pivot rod which link rotates with the pivot rod; and
    (f) a cable having one end connected to the link and another end connected to an actuable component carried on the housing such that the cable is pulled when the pivot rod and the link are rotated by a sliding motion of the control member to control the operation of the component.

26. An outdoor power equipment unit as recited in claim 25, wherein the control member is a handle grip.

27. An outdoor power equipment unit as recited in claim 25, wherein the housing has a self propel system providing powered movement of the housing over the ground at a variable ground speed, and wherein the component that is controlled by the cable is the self propel system such that the control member controls the ground speed of the housing.

28. An outdoor power equipment unit as recited in claim 25, wherein the handle assembly includes two spaced handle tubes, and wherein the first portion of the pivot rod is a central portion of the pivot rod located between two spaced offset end portions with each offset end portion of the pivot rod being rotatably journalled on one of the handle tubes.

29. An outdoor power equipment unit, which comprises:
    (a) a housing having a self propel system to provide the housing with movement over the ground;
    (b) a handle extending upwardly from the housing to allow an operator to hold the handle and thereby guide the housing during its movement over the ground, the handle including at least one upwardly extending handle tube having a lower end connected to the housing;
    (c) a first control member slidably mounted on the at least one handle tube to control operation of the self propel system carried on the housing; and
    (d) a second control member pivotally mounted on the first control member to be carried therewith as the first control member slides on the handle tube, wherein the second control member is arranged to control operation of a turf grooming member carried on the housing.

30. An outdoor power equipment unit as recited in claim 29, wherein the turf grooming member is a grass cutting element.

31. An outdoor power equipment unit as recited in claim 29, wherein the first control member comprises a Ushaped handle grip slidably_mounted on the at least one handle tube.

32. An outdoor power equipment unit as recited in claim 31, wherein the second control member comprises a pivotal Ushaped bail pivotally mounted on the slidable U-shaped handle grip.

33. An outdoor power equipment unit as recited in claim 30, wherein the housing includes a cutting chamber and the grass cutting element comprises a rotary cutting blade contained in the cutting chamber such that the outdoor power equipment unit is a lawn mower.

* * * * *

UNITED STATES PATENT AND TRADEMARK OFFICE
CERTIFICATE OF CORRECTION

PATENT NO. : 6,082,083
DATED : July 4, 2000
INVENTOR(S) : Philip G. Stalpes et al.

It is certified that error appears in the above-indentified patent and that said Letters Patent is hereby corrected as shown below:

In claim 13, "around" should read --ground-- at
           Column 12, lines 26, 28 and 31.

In claim 23, "tubes" should read --tube-- at Column 13, line 36.

In claim 31, "Ushaped" should read --U-shaped-- at Column 14, line 51.

In claim 31, "slidably_mounted" should read --slidably mounted-- at
           Column 14, line 52.

In claim 32, "Ushaped" should read --U-shaped-- at Column 14, line 56.

Signed and Sealed this

Twenty-fourth Day of April, 2001

Attest:

NICHOLAS P. GODICI

*Attesting Officer*      *Acting Director of the United States Patent and Trademark Office*